US008826397B2

(12) United States Patent
Sheets et al.

(10) Patent No.: US 8,826,397 B2
(45) Date of Patent: Sep. 2, 2014

(54) SECURE REMOTE AUTHENTICATION THROUGH AN UNTRUSTED NETWORK

(75) Inventors: John F. Sheets, San Francisco, CA (US); Simon Hurry, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 952 days.

(21) Appl. No.: 12/354,242

(22) Filed: Jan. 15, 2009

(65) Prior Publication Data

US 2010/0180326 A1     Jul. 15, 2010

(51) Int. Cl.
*H04L 9/32* (2006.01)

(52) U.S. Cl.
USPC .............. 726/6; 726/2; 726/4; 726/5; 726/28; 713/155; 713/168; 713/169; 713/170; 380/247

(58) Field of Classification Search
USPC .................. 726/2–32; 713/18, 150–194, 200, 713/FOR. 123, FOR. 125; 380/247
See application file for complete search history.

(56) References Cited

U.S. PATENT DOCUMENTS

| 5,666,415 | A  | * | 9/1997  | Kaufman ....................... 713/159 |
| 6,538,996 | B1 | * | 3/2003  | West et al. .................... 370/238 |
| 6,567,794 | B1 |   | 5/2003  | Cordery et al. |
| 6,647,498 | B1 | * | 11/2003 | Cho ................................ 726/17 |
| 7,360,694 | B2 | * | 4/2008  | Wankmueller ................ 235/382 |
| 7,707,120 | B2 | * | 4/2010  | Dominguez et al. ............. 705/78 |
| 7,827,115 | B2 | * | 11/2010 | Weller et al. .................... 705/78 |
| 7,845,003 | B2 |   | 11/2010 | Morris et al. |
| 7,870,599 | B2 | * | 1/2011  | Pemmaraju ....................... 726/2 |
| 7,930,554 | B2 |   | 4/2011  | Coulier et al. |

| 2001/0037315 | A1 |   | 11/2001 | Saliba et al. |
| 2002/0111919 | A1 | * | 8/2002  | Weller et al. .................... 705/67 |
| 2002/0194138 | A1 | * | 12/2002 | Dominguez et al. ............ 705/64 |
| 2003/0056092 | A1 | * | 3/2003  | Edgett et al. .................... 713/153 |
| 2003/0065919 | A1 | * | 4/2003  | Albert et al. .................... 713/168 |
| 2003/0089767 | A1 | * | 5/2003  | Kiyomatsu ..................... 235/379 |
| 2004/0078669 | A1 | * | 4/2004  | Lang et al. ....................... 714/27 |
| 2004/0127277 | A1 |   | 7/2004  | Walker et al. |

(Continued)

FOREIGN PATENT DOCUMENTS

WO     WO 97/33231 A1    9/1997

OTHER PUBLICATIONS

Search/Examination Report dated Jul. 30, 2010 from International Application No. PCT/US2010/020935, 11 pages.

(Continued)

*Primary Examiner* — Saleh Najjar
*Assistant Examiner* — Peiliang Pan
(74) *Attorney, Agent, or Firm* — Kilpatrick Townsend & Stockton

(57) ABSTRACT

A method for securely authenticating a user of a consumer device at an access device comprising the following steps. First, a dynamic data element and a first set of transactional information is sent to the consumer device from the access device. Next, the consumer device creates an authentication code as a function of at least the dynamic data element, a subset of the first set of transactional information, and a password. The authentication code, along with other data, is then sent from the consumer device back to the access device. The access device then uses the authentication code to send an authentication request message to the service provider of the user. The service provider then attempts to authenticate the user by recreating the authentication code and comparing the recreated authentication code with the authentication code received from the access device.

27 Claims, 8 Drawing Sheets

(56) References Cited

U.S. PATENT DOCUMENTS

| | | | |
|---|---|---|---|
| 2005/0021959 A1* | 1/2005 | Tsushima et al. | 713/170 |
| 2005/0022020 A1* | 1/2005 | Fremberg | 713/201 |
| 2005/0044354 A1 | 2/2005 | Hagerman | |
| 2005/0234833 A1 | 10/2005 | VanFleet et al. | |
| 2005/0240522 A1* | 10/2005 | Kranzley et al. | 705/40 |
| 2006/0212407 A1 | 9/2006 | Lyon | |
| 2006/0237528 A1 | 10/2006 | Bishop et al. | |
| 2007/0006305 A1 | 1/2007 | Florencio | |
| 2007/0143227 A1 | 6/2007 | Kranzley et al. | |
| 2007/0180265 A1* | 8/2007 | Hiroshi | 713/187 |
| 2007/0250920 A1 | 10/2007 | Lindsay | |
| 2008/0040271 A1* | 2/2008 | Hammad et al. | 705/41 |
| 2008/0114653 A1* | 5/2008 | Harmon et al. | 705/14 |
| 2008/0120214 A1* | 5/2008 | Steele et al. | 705/35 |
| 2008/0155655 A1* | 6/2008 | Wankmueller | 726/2 |
| 2008/0301056 A1* | 12/2008 | Weller et al. | 705/67 |
| 2009/0037982 A1* | 2/2009 | Wentker et al. | 726/3 |
| 2009/0077104 A1 | 3/2009 | Sheets | |
| 2010/0180326 A1* | 7/2010 | Sheets et al. | 726/6 |
| 2010/0180327 A1* | 7/2010 | Sheets et al. | 726/6 |

OTHER PUBLICATIONS

"Web Password Hashing," [Online}, [retrieved on Mar. 11, 2009], retrieved from http://crypto.stanford.edu/PwdHash/, pp. 1-3.

Office Action mailed Aug. 27, 2012 in U.S. Appl. No. 12/355,458, 19 pages.

Office Action mailed Sep. 30, 2011 in U.S. Appl. No. 12/355,458, 19 pages.

* cited by examiner

SECURE REMOTE AUTHENTICATION THROUGH AN UNTRUSTED NETWORK

BACKGROUND

Modern technologies have allowed cashless transactions to be conducted using a variety of unconventional devices, such as mobile phones and PDAs. Often times, when a mobile phone, PDA, or other similar device is used to conduct a financial transaction, the user of the device uses a username and password to authorize the transaction associated with a financial account owned by the user. While modern technology has made it convenient to engage in commerce at any time or location using a variety of different consumer devices, the use of untrusted terminals, such as an access device at the point of sale, and untrusted networks, such as the Internet, create new opportunities for fraudulent access to or misuse of sensitive data.

Unauthorized access to sensitive data, such as a username/password combination, may allow for the execution of fraudulent financial transactions. Fraudulent transactions may occur without the knowledge of either party to a legitimate financial transaction. An eavesdropper or "hacker" may be able to use leaked sensitive information to fraudulently authenticate himself to other parties and gain unauthorized access to data, resources, or money. As soon as sensitive data leaves a trusted device, such as a mobile phone or PDA, the data becomes vulnerable to interception and misuse. For example, a point of sale terminal could maintain a log of the usernames and associated passwords that pass through the terminal. This stored information could then be later used in replay attacks to fraudulently create charges on any compromised accounts.

One way to reduce the likelihood of fraudulent use of sensitive data is to re-engineer systems so that sensitive data is not transmitted except in a suitably scrambled form. This is typically accomplished by performing a cryptographic operation on the data, thus changing its form. Encryption requires the creation, distribution, and management of keys. Encryption also requires decryption before protected data can be used. Finally, methods of encrypting data known in the art may require data to be decrypted and re-encrypted multiple times as it passes from system to system or between domains within systems.

It would be desirable to have methods and systems for enabling sensitive data elements to be transformed before the data is transmitted in such a way that this transformation need only occur once, at the time of transaction data collection. It would also be desirable if such methods and systems did not require the computational resources associated with cryptographic computations. It would also be desirable if such methods and systems did not require the creation, distribution, and management of cryptographic keys or other secret information. It would also be desirable if such methods and systems allowed users to authorize transactions against their financial accounts using usernames and passwords without exposing that sensitive data to any third parties.

Embodiments of the invention address these problems and other problems individually and collectively.

SUMMARY

Embodiments of the present invention are directed to solving or overcoming one or more of the above-described problems. The techniques used in these various embodiments are also applicable to a broader range of information exchanges or any situation where authentication occurs using mechanisms such as a username and password.

One embodiment for securely authenticating a user at an access device begins by sending to a consumer device (e.g., a contactless phone) a first set of transactional information and a dynamic data element. Next, an access device receives from the consumer device an authentication code wherein the first authentication code is created by the consumer device as a function of at least a subset of the first set of transactional information, the dynamic data element, and a password. The access device then sends the authentication request message to a service provider containing at least the authentication code and additional information sufficient to allow the service provider to recreate the authentication code. Finally, the access device receives from the service provider an authentication response message wherein the authentication response message indicates if the recreated authentication code corresponds to the authentication code sent in the authentication request message.

Another embodiment for securely authenticating a user of a consumer device begins by receiving at a service provider an authentication request message containing at least an authentication code and additional information sufficient to allow the service provider to recreate the authentication code, wherein the authentication code is created by the consumer device as a function of at least a dynamic data element, a password, and a subset of a first set of transactional information. Next, a service provider recreates an authentication code as a function of at least the dynamic data element, a subset of information contained in the authentication request message, and other data locally available to the service provider, wherein the locally available data can be retrieved as a function of the data contained in the authentication request. The recreated authentication code is then compared to the authentication code received in the authentication request message. Next, the user is authenticated based at least in part on the comparison of the recreated authentication code and the authentication code received in the authentication request message. An authentication response message is then sent indicating the result of the authentication step to an access device.

Another embodiment for securely authenticating a user of a consumer device starts by receiving from an access device a dynamic data element and a first set of transactional information. Next, an authentication code is created as a function of at least a password, the dynamic data element, and a subset of the first set of transactional information. The authentication code is then sent to the access device, wherein the access device uses the authentication code to authenticate the user by sending an authentication request message to a service provider, wherein the authentication request message contains at least the authentication code and additional information sufficient to allow the service provider to recreate the authentication code, and wherein the service provider responds to the authentication request message by sending an authentication response message indicating if the recreated authentication code corresponds to the authentication code sent in the authentication request message.

These and other embodiments of the invention are described in further detail below.

DETAILED DESCRIPTION

I. Exemplary Payment Processing System

In a typical purchase transaction, a consumer uses a consumer device to purchase goods or services from a merchant.

Figure 1:
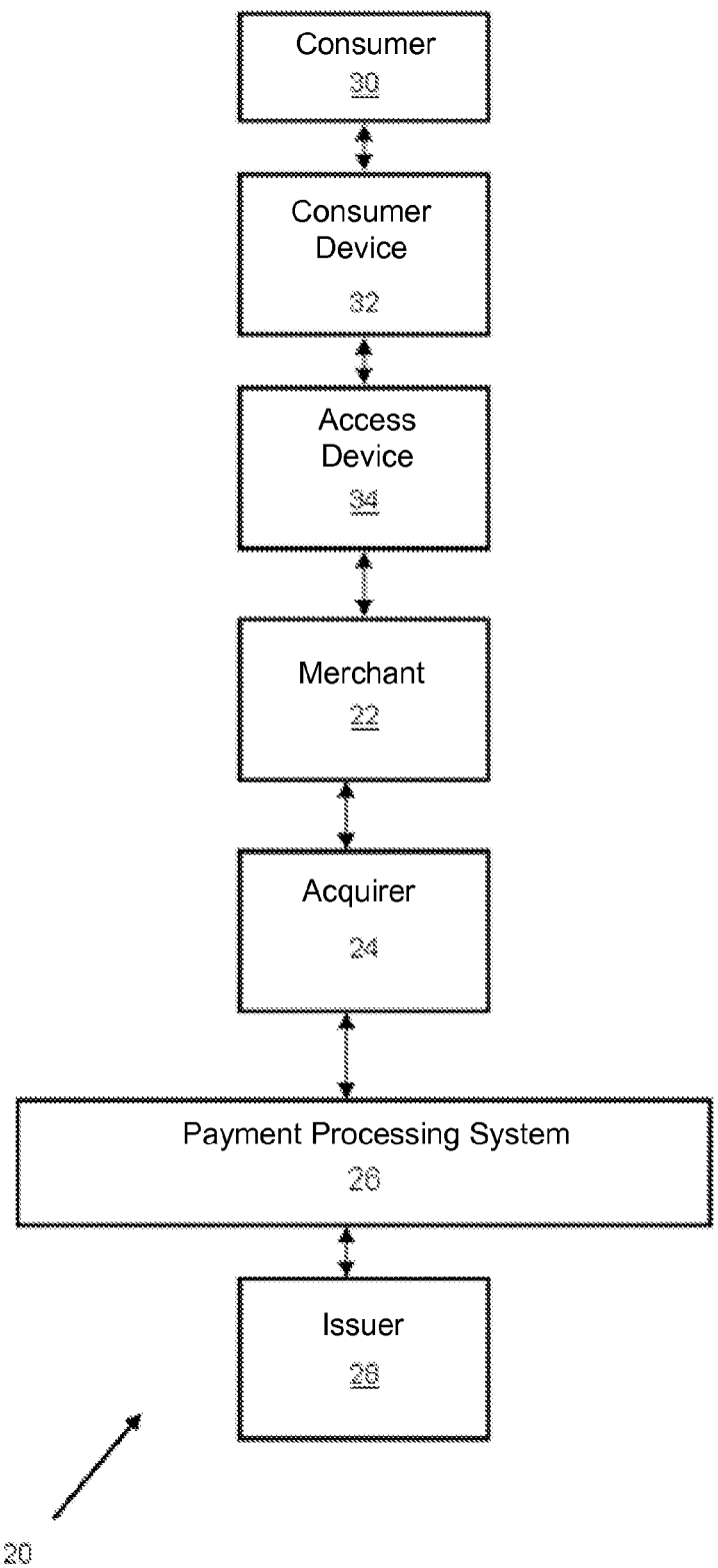
FIG. 1 shows a diagram of a payment processing system that can be used in some embodiments of the invention.

FIG. 1 shows a system 20 that can be used in an embodiment of the invention. The system 20 includes a merchant 22 and an acquirer 24 associated with the merchant 22. In a typical payment transaction, a consumer 30 may purchase goods or services at the merchant 22 using a consumer device 32. The acquirer 24 can communicate with an issuer 28 via a payment processing system 26. For the purposes of the proposed methods, the acquirer 24, payment processing system 26, or issuer 28 can each individually act as a service provider. They can also act as a service provider by working together in any combination.

The consumer 30 may be an individual, or an organization such as a business that is capable of purchasing goods or services.

The consumer device 32 may be in any suitable form, and further descriptions of suitable consumer devices are provided below.

The payment processing system 26 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 26 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system 26 may use any suitable wired or wireless network, including the Internet.

The merchant 22 may also have, or may receive communications from, an access device 34 that can interact with the consumer device 32. The access devices according to embodiments of the invention can be in any suitable form. Examples of access devices include point of sale (POS) devices, cellular phones, PDAs, personal computers (PCs), server computers, tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the consumer devices 32. Alternatively, the access device 34 may interact with the consumer devices 32 remotely using a network such as the Internet.

In a typical purchase transaction, the consumer 30 purchases a good or service at the merchant 22 using a consumer device 32 such as a mobile phone. The consumer's consumer device 32 can interact with an access device 34 such as a POS (point of sale) terminal at the merchant 22. For example, the consumer 30 may take a mobile phone and may wave it past a contactless reader at POS terminal, such that the POS terminal and the mobile phone communicate in a wireless manner.

An authorization request message is then forwarded to the acquirer 24. After receiving the authorization request message, the authorization request message is then sent to the payment processing system 26. The payment processing system 26 then forwards the authorization request message to the issuer 28 of the consumer device 32.

After the issuer 28 receives the authorization request message, the issuer 28 sends an authorization response message back to the payment processing system 26 to indicate whether or not the current transaction is authorized (or not authorized). The transaction processing system 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the POS terminal, or may be printed out on a receipt.

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

II. Consumer Devices and Computer Apparatuses

Figure 2:
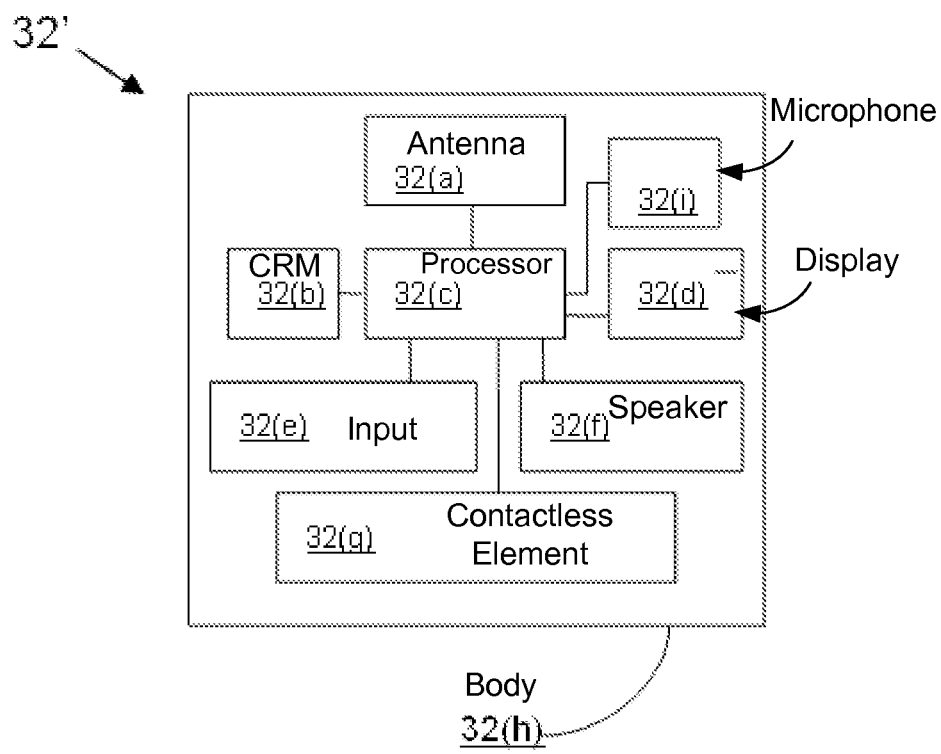
FIG. 2 shows a block diagram of an exemplary consumer device.

FIG. 2 shows a block diagram of a consumer device and subsystems that may be present in computer apparatuses in systems according to embodiments of the invention.

A consumer device 32 may be in any suitable form. For example, in some embodiments the consumer device is a personal computer. The consumer device may run software that is specific to the methods described herein, or the consumer device may run generic software, such a web browser, that allows the consumer device to communicate with the other entities shown in FIG. 1.

A portable consumer device, is one particular kind of consumer device 32. A portable consumer device may also be in any suitable form. For example, suitable portable consumer devices can be hand-held and compact so that they can fit into a consumer's wallet and/or pocket (e.g., pocket-sized). They may include cellular phones, personal digital assistants (PDAs), pagers, smart media, transponders, and the like. The portable consumer devices can also be debit devices, credit devices, or stored value devices. In some embodiments, portable consumer devices can include laptop computers.

An exemplary consumer device 32' in the form of a phone may comprise a computer readable medium and a body as shown in FIG. 2. (FIG. 2 shows a number of components, and the consumer devices according to embodiments of the invention may comprise any suitable combination or subset of such components.) The computer readable medium 32(b) may be present within the body 32(*h*), or may be detachable from it. The body 32(*h*) may be in the form a plastic substrate, housing, or other structure. The computer readable medium 32(*b*) may be a memory that stores data and may be in any suitable form including a magnetic stripe, a memory chip, uniquely derived keys, etc. The memory also preferably stores information such as financial information, etc. Financial information may include information such as bank account information, bank identification number (BIN), credit or debit card number information, account balance information, expiration date, consumer information such as name, date of birth, etc. Any of this information may be transmitted by the consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The consumer device 32 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) consumer device 32 and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability. RFID, Bluetooth™, infra-red, or other data transfer capability can also be used to exchange data between the consumer device 32 and an interrogation device. Additionally, the consumer device 32 may have the ability to communicate to another device remotely through Wi-Fi or through the Internet. Thus, the consumer device 32 is capable of communicating and transferring data and/or control instructions via cellular network, near field communications capability, or other communication means.

The consumer device 32 may also include a processor 32(*c*) (e.g., a microprocessor) for processing the functions of the consumer device 32 and a display 32(*d*) to allow a consumer to see phone numbers and other information and messages. The consumer device 32 may further include input elements 32(*e*) to allow a consumer to input information into the device, a speaker 32(*f*) to allow the consumer to hear voice communication, music, etc., and a microphone 32(*i*) to allow the consumer to transmit her voice through the consumer device 32. The consumer device 32 may also include an antenna 32(*a*) for wireless data transfer (e.g., data transmission).

Figure 3:
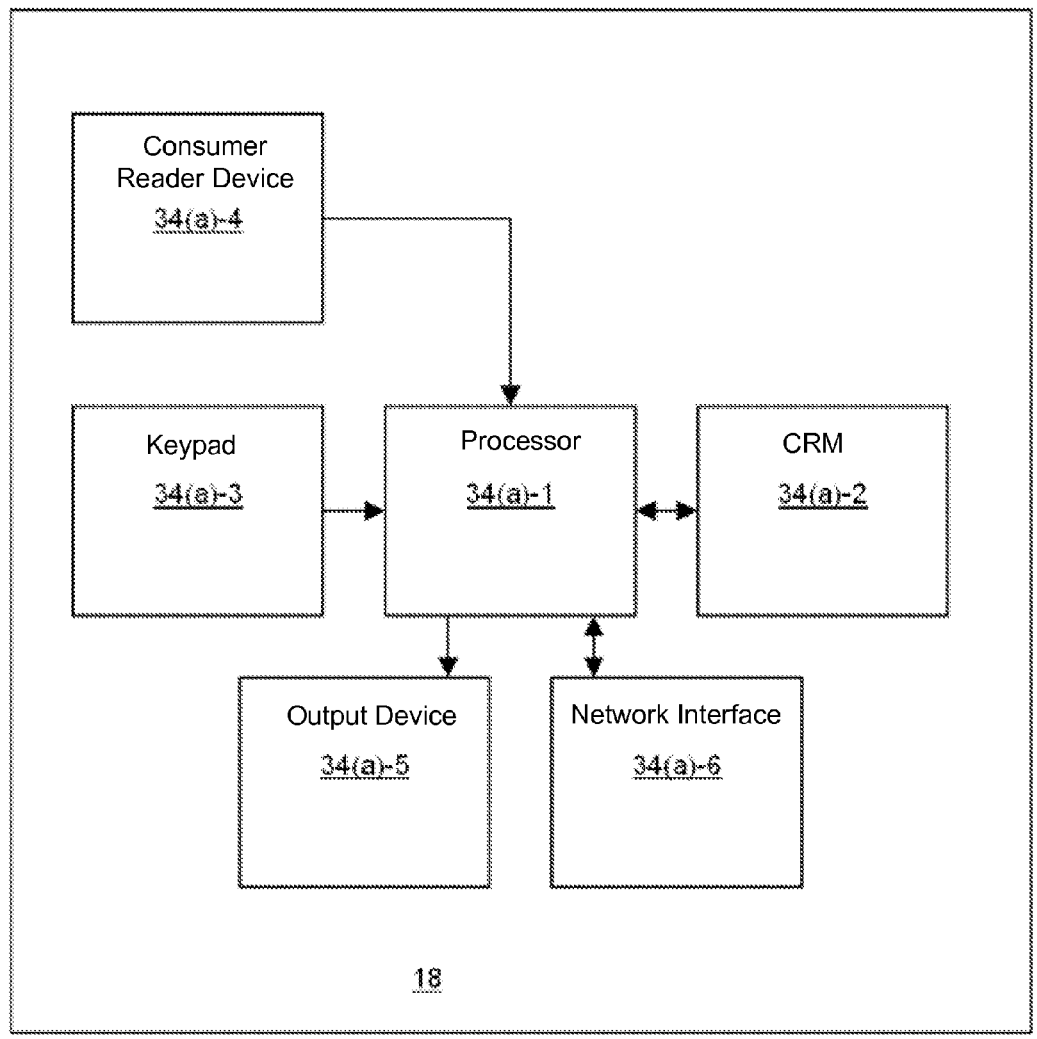
FIG. 3 shows an block diagram of an exemplary access device.

FIG. 3 shows a block diagram showing basic components that may reside in an exemplary access device 34. The access device 34 may be an example of a point of data entry (as described above). An exemplary access device 34 may comprise a processor 34(*a*)-1. It may also comprise a computer readable medium 34(*a*)-2, keypad 34(*a*)-3, a consumer device reader 34(*a*)-4, an output device 34(*a*)-5, and a network interface 34(*a*)-6, all operatively coupled to the processor 34(*a*)-1. A housing may house one or more of these components. Exemplary consumer device readers can include RF (radio frequency) antennas, magnetic stripe readers, etc. that interact with a consumer device 32. Additionally, the access device 34 may interact with a consumer device remotely 32 through the network interface 34(*a*)-6. The network interface 34(*a*)-6 may provide access to the Internet, a telco network, or other network that allows the access device 34 to communicate with a consumer device 32. Suitable output devices may include displays and audio output devices. Exemplary computer readable media may include one or more memory chips, disk drives, etc.

Figure 4:
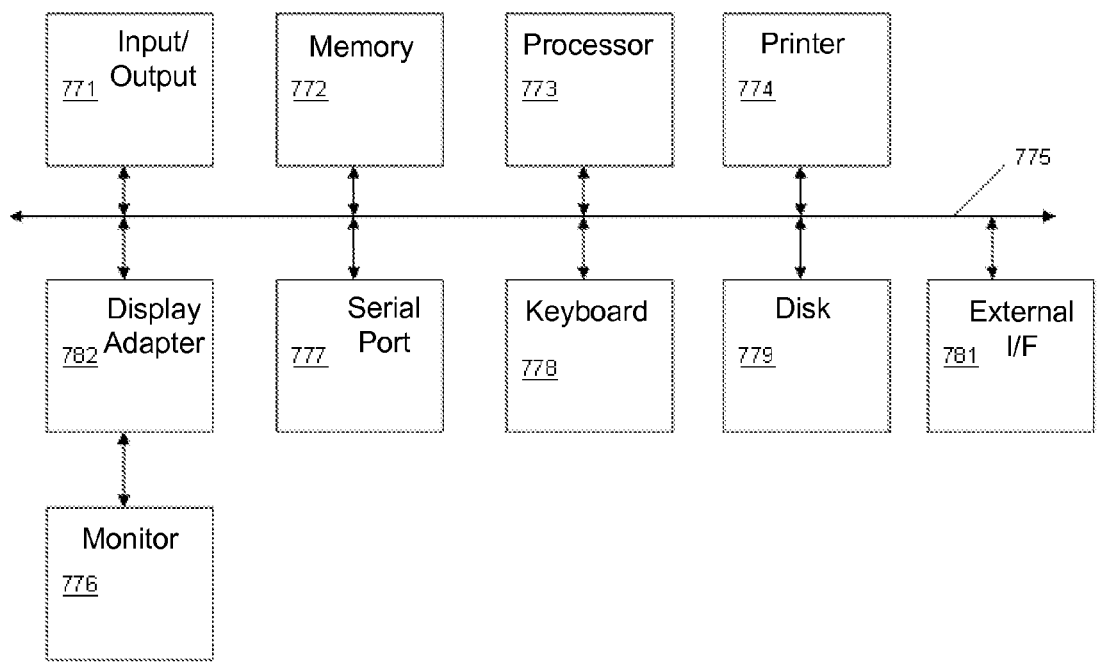
FIG. 4 shows an block diagram of an exemplary computer apparatus.

The computer readable medium 34(*a*)-2 in the access device 34 may comprise code for sending to a consumer device a first set of transactional information and a dynamic data element; code for receiving from the consumer device an authentication code wherein the first authentication code is created by the consumer device as a function of at least a subset of the first set of transactional information, the dynamic data element, and a password; code for sending an authentication request message to a service provider containing at least the authentication code and additional information sufficient to allow the service provider to recreate the authentication code; and code for receiving from the service provider an authentication response message wherein the authentication response message indicates if the recreated authentication code corresponds to the authentication code sent in the authentication request message The various participants and elements in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 4. The subsystems shown in FIG. 4 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

If the computer apparatus is operated by a service provider, the computer readable medium in the computer apparatus may include code for receiving at a computer an authentication request message containing at least an authentication code and additional information sufficient to allow the service provider to recreate the authentication code, wherein the authentication code is created by the consumer device as a function of at least a dynamic data element, a password, and a subset of a first set of transactional information; code for recreating an authentication code as a function of at least the dynamic data element, a subset of information contained in the authentication request message, and other data locally available to the service provider, wherein the locally available data can be retrieved as a function of the data contained in the authentication request; code for comparing the recreated authentication code with the authentication code received in the authentication request message; and code for authenticating the user based at least in part on the comparison of the recreated authentication code and the authentication code received in the authentication request message; and code for sending an authentication response message indicating the result of the authentication step to an access device.

III. Authentication Processes

In an embodiment of the invention, a username and password to be used to authenticate a user is used in a transaction is protected by using a function to transform the password into a scrambled form. The scrambled data is created in a way so that it is only capable of authenticating the user in the instant transaction. The function that transforms the password can be a function such as a hashing function that combines the password, a dynamic data element, such as a nonce, and other data into a form that allows the user to be authenticated while simultaneously protecting the username/password combination from being exposed to third parties.

As used herein, a "transaction" can be a flow of information between entries, such as a payer and a payee.

As used herein, a "hash" can be a function that maps a field of arbitrary length and datatype to a fixed-length or arbitrary-length series of characters in such as a way that it is computationally infeasible to find any two distinct inputs which map to the same output. Examples of well-known hash functions include SHA-1 and MD5.

As used herein, a "nonce" can be a value that is not be repeatable, except by chance. A nonce may be, but need not be, random or unpredictable, so long as it is computationally infeasible for anyone external to the system to force the result to a given value. A nonce is one example of a dynamic data element.

Figure 5:
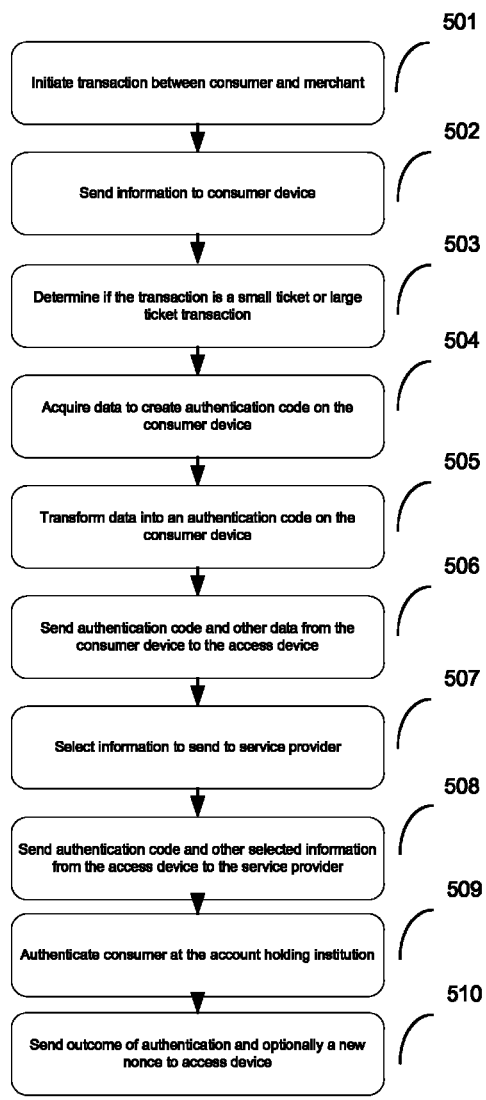
FIG. 5 shows a diagram of the steps of the proposed method according to one embodiment.

FIG. 5 is a flow chart showing the steps involved in using a username and password to securely authenticate a user conducting a transaction according to an embodiment of the invention. One or more of the steps outlined in FIG. 5 may be embodied in a computer readable medium. The computer readable medium can then be contained in a consumer device, point of sale terminal, server, information provider, point of data entry, information consumer, or any other similar device. The computer readable medium can also be distributed between two or more of the aforementioned devices.

The steps illustrated in FIG. 5 can be described with reference to FIG. 1. At step 501, a transaction between a consumer 30 and a merchant 22 is initiated. The consumer 30 uses a consumer device 32, such as a cellular phone or a PDA, to conduct the transaction. The merchant 22 uses an access device 34, such as a point-of-sale terminal, to communicate with the consumer's consumer device 32. The access device 34 can also communicate with a service provider to authenticate the user conducting the transaction. In this example, the service provider could be the issuer 28, a payment processing organization associated with the payment processing network 26, or any other suitable entity. The action taken at step 501, in some embodiments, can be as simple as establishing a line of communication between the consumer device 32 and the access device 34 so that the two devices can exchange the information necessary to conduct the transaction. In some embodiments, step 501 can occur when the consumer device 32 and the access device 34 are not located in the same location. For example, the consumer device 32 and the access device 34 can communicate remotely over the Internet. In other embodiments, the consumer device may be a personal computer used by a consumer to conduct a transaction with a merchant over the Internet.

In some embodiments, after the transaction is initiated, the access device 34 sends information to the consumer device 32 at step 502. The information sent to the consumer device 32 in one embodiment includes a dynamic data element, such as a nonce, and other transactional information. The transactional information can include data such as the transaction amount, a terminal identification number (terminal ID) associated with the access device, and potentially other pieces of information relevant to the transaction or the proposed method. Any combination of this transactional data may form a first set of transactional information. A contactless element in the consumer device 32 can send the information to the consumer device 32 via another contactless element in the consumer device 32. This information may be stored in a memory (at least temporarily) in the consumer device 32.

At step 503, a processor in the consumer device 32 uses the transactional information sent to it by the access device 34 to determine whether the transaction is a small-value transaction or a large-value transaction. A variety of factors can be used to determine whether a given transaction is a small-value transaction or a large-value transaction. In one embodiment, the determination is made based on the value of the transaction. If the value of the transaction is less than or equal to the small-value transaction limit, then the transaction is considered a small-value transaction. If the value is greater than the small-value transaction limit, then the transaction is considered a large-value transaction. For example, a transaction greater than $10 may be considered a large-value transaction, while a transaction less than $10 may be considered a small-value transaction. In other embodiments, a transaction greater than $1, $5, $20, or even $100 may differentiate a low value transaction from a high value transaction. Other embodiments may use different criteria for this determination, such as the transaction location, frequency of transactions, currency of the transaction, historical use of the consumer device in conducting financial transaction, or other combinations of criteria.

After the consumer device has determined whether the transaction is a small-value transaction or a large-value transaction, the consumer device collects the data that it will use to create a first authentication code. In one embodiment, the data used to create the first authentication code includes the username associated with the financial account of the user, either the large value or small value password, the amount of the transaction, the identification number associated with the terminal, and the dynamic data element sent to the consumer device from the terminal. Other embodiments may use different combinations of variables.

Different embodiments can also acquire each piece of data used in the creation of the authentication code using different mechanisms. For example, in one embodiment, a nonce to be used as a dynamic data element could be created by the consumer device rather than being transmitted to the consumer device from the access device. In another embodiment, the small value password is stored in the consumer device so that it can be used to create authentication codes for multiple transactions without any additional input from the user of the consumer device. In another embodiment, a large value password is not stored in the consumer device between transactions. In this embodiment, the large value password is entered into the consumer device by the user of the consumer device each time the consumer device is used to conduct a large value transaction. Other pieces of data can also be obtained from sources such as the access device or other sources on a data network.

In some embodiments of the invention, It is desirable to store the small value password in the consumer device 32 and not require the user to enter it into the consumer device 32, because the transaction value may be so low that the consumer 30 may not want to take the time to enter it into the portable consumer device 32 for each and every purchase. On the other hand, it is desirable to have the consumer 30 input the large value password into the consumer device 32. If the consumer device 32 is stolen, the large value password would not be accessible to the thief. Further, even if the thief is able to obtain the low value password, the thief would only be able to make low value purchases so likelihood of substantial financial theft is low.

At step 505, the dynamic data element, password, and other selected data are transformed into a scrambled form in the consumer device 32 using a selected function. The selected function need not be an encrypted function, and encryption keys are not used in embodiments of the invention. The selected function will generally be a function that transform the data in one direction so that it computationally infeasible to recreate the input data from the output. In some embodiments, the function used to transform the data is a hash function such as SHA-256. The password is selected as an input to the transformation function, because the password provides the data that will show that the consumer 30 associated with the consumer device 32 is authenticated. A dynamic data element is used as one of the inputs to the transformation function because it reduces the ability of any participant in the transaction to fake an authentication code. This feature can be strengthened in certain embodiments by having the service provider generate and distribute the dynamic data elements used in the transactions.

In addition to applying a function such as a hashing function to scramble the data, other operations can also be taken on the output of the function to create the authentication code. For example, in some embodiments, the output of the function can be truncated so that only a portion of the output is used as the authentication code. The potential security benefits to this step that will be discussed more fully below in reference to FIG. 7.

At step 506, the newly created authentication code is sent to from the consumer device 32 to the access device 34. In addition to the authentication code, other data, such as the username associated with the financial account, can also be sent from the consumer device 32 to the access device 34. The data can be sent through a wireless connection formed between the consumer device 32 and the access device 34 or through any other suitable means.

At step 507, the access device 34 assembles the data that will be sent to the service provider (e.g., the issuer 28) in an authentication request message. In one embodiment, the access device 34 sends the username and authentication code from the consumer device 32 along with a dynamic data element, transaction amount, and a terminal ID to the service provider (e.g., the issuer 28). In other embodiments, a different set of data can be sent to the service provider (e.g., the issuer 28). At a minimum, the service provider needs to receive the authentication code and enough additional information so that the service provider (e.g., the issuer 28) can recreate the authentication code. The additional information sent to the service provider (e.g., the issuer) does not need to be directly used to create the authentication code; the additional information can be used by the service provider to find data that is used in the authentication code.

At step 508, the authentication code and other data selected to be sent to the service provider is sent to the service provider. The data can be sent to the service provider using through a dedicated connection to a service such as Visa-Net™, or it could be sent to a server operated by the service provider over the Internet. Other embodiments might use other means to send the data to the service provider.

After the server computer operated by the service provider (e.g., the issuer 28) receives authentication request message from the access device 34, a processor in the server computer operated by the service provider (e.g., the issuer 28) attempts to authenticate the consumer 30 at step 509. In one embodiment, the first step of authenticating includes the recreation of the authentication code contained in the authentication request message. In one of the above examples, the authentication code was created from the username, password, transaction amount, terminal ID, and dynamic data element. It is possible that the values for all of these data elements, with the exception of the password, were sent to the service provider from the access device in the authentication request message. If that is the case, then the service provider needs only two additional data elements in order to recreate the authentication code: the appropriate password associated with the username for the type of transaction at issue and the method used to create the authentication code.

In one embodiment, a server computer operated by the service provider can look up the password used in the authentication code as a function of the transaction amount and/or the username. For example, the service provider (e.g., the issuer 28) simply needs to look up either the small value password or the large value password associated with the username of the account based upon whether the transaction amount is above or below the small value limit. The large value password and the small value password can be found by the service provider in a database or other similar storage repository accessible by the service provider. Thus, the password would be an example of data locally available to the service provider. Other embodiments may use other criteria to determine the appropriate password used to create the authentication code.

In addition to having all of the data elements used to create the authentication code, the server computer operated by service provider also needs to know the exact method used to create the original authentication code. In an example embodiment described above, the authentication code was created by the server computer by truncating the output of a hash of selected input data.

Once the recreated authentication code is computed, the user can be authenticated in a manner appropriate for the transaction. For instance, in one embodiment, the authentication process may consist of two steps. The first step is to verify that the authentication code in the authentication request message matches the recreated authentication code. If the two authentication codes match, then it shows that the consumer device 32 and the service provider (e.g., the issuer 28) both possessed and used the same data elements to create each authentication code—including the correct password associated with the username in the authentication request message. The second step of the authentication process can then follow the same authentication process as outlined with respect to FIG. 1, if necessary. Other embodiments may use a different set of checks before authenticating the transaction. For example, in another embodiment, it is possible that the consumer device 32 associated with the account is deactivated for some reason. Even though the account may be active with sufficient funds for the transactions and a valid authentication code has been submitted, the authentication check may still fail because the request is coming from a deactivated device.

After the authentication check has been conducted by the service provider (e.g., the issuer 28), server computer operated by the service provider (e.g., the issuer 28) sends the result of the authentication check through a data bus in the server computer, and back to the access device 34 in an authentication response message. This step is shown at 510. Different embodiments may communicate the result of the authentication check in different ways. For example, one embodiment may only return one of two results: authenticated or not authenticated. Other embodiments may return additional information, such as information informing the access device why the authentication check succeeded or failed.

In addition to communicating the result of the authentication check, some embodiments may also send a new dynamic data element to the access device 34. This second dynamic data element can be used by a processor in the access device 34 as the dynamic data element used to create a new authentication code in the next authentication request message the access device 34 sends to the service provider (e.g., the issuer 28). Both the service provider and the access device 34 can store the value of this dynamic data element in appropriate memories. If a dynamic data element other than the dynamic data element sent to the access device 34 is used by the access device 34 on its next authentication request, the authentication request will fail. It will fail because the service provider (e.g., the issuer 28) will use its locally stored dynamic data element value associated with the access device 34 to recreate the authentication code in response to the next authentication request message the service provider receives from the access device 34. The advantage of generating the dynamic data element in this fashion is that the access device 34 no control over what the value of the dynamic data element will be for the next transaction, and thus it becomes more difficult for the access device 34 to send fraudulent access codes to the service provider (e.g., the issuer 28).

In some embodiments in which the dynamic data element is supplied to an access device from a service provider, there may be more than one dynamic data element that will produce a valid authentication code. One reason certain embodiments may have this capability is that an access device 34 may be handling many different transactions asynchronously and simultaneously. As a result, an access device 34 may not always be able to send to the service provider an authentication code created from the most recently received dynamic data element. This timing problem may result from various consumer devices creating different delay periods from the time they receive a dynamic data element to the time that the consumer devices submit an authentication code.

For example, if the access device is in the form of a server computer running a commercial web site for a merchant, there may a large number of consumers using consumer devices, such as personal computers running web browsers, accessing the access device at any given moment. Each of these consumer devices may be sent a different dynamic data element from the access device. The various consumer devices may then each take a different amount of time to submit their authentication codes back to the access device. For example, some consumer devices may be connected to the access device over a relatively slow network. Other consumer devices may be older computers with slower processors or less memory. Another possible reason for the difference in consumer device response times may be that the various consumers using the consumer devices respond at different rates. Whatever the reason for the delay, an access device may not have any control over this delay. In embodiments where the dynamic data element is supplied by a server provider, the varying consumer device response times may mean that the dynamic data element most recently received by the access device may not be the dynamic data element used to create the next authentication code sent from the access device to the service provider. In order to account for this situation, the service provider may allow authentication codes to be used that are created from a set of recently transmitted dynamic data elements. In some embodiments, the validity of dynamic data elements may expire once they are used or after a defined time period has elapsed.

One of the advantages of the process outlined in FIG. 5 is that the access device 34 does not possess, at any point during the transaction, any information that can later be used against the user of the consumer device 32 to conduct a fraudulent transaction. In the embodiments described above, the authentication code created by the consumer device 32 includes not only information specific to the instant transaction, but also a dynamic data element such as a nonce. The result is that the authentication code is valid only for the instant transaction and is in a format that makes it very difficult for the access device 34 to determine the original information used to create the authentication code. That means that sensitive data, such as a password associated with the username of the account, is never exposed to the access device.

Another advantage of the process outlined in FIG. 5 is that any untrusted device that receives data related to the transaction does not receive any information in a usable form that can later be used against the user of the consumer device 32 to conduct a fraudulent transaction. For example, if the consumer device 32 communicates with an access device 34 over the Internet, then none of the computers that sit between the consumer device 32 and the access device 34 that allow the communication to take place ever receive sensitive consumer information.

Furthermore, the access device 34 does not need to be aware of the specific methods used to create the authentication code since it never needs to validate the authentication code. Additionally, in the embodiments where the dynamic data element is generated by the service provider, the ability of the access device 34 or any other party to create a fraudulent authentication code is reduced even further. In some embodiments, the access device 34 does little more than pass information back and forth between the consumer device 32 and the service provider without ever possessing information that is useful outside of the context of the present transaction. In this way, the password and other sensitive data associated with the user account is used securely used to authenticate the user conducting the transaction without the computational resources or shared secrets necessary for typical cryptographic methods. It is known that some fraudsters can substitute fake access devices (e.g., point of sale terminals) for real access devices to steal information from consumers. Embodiments of the invention address this problem.

Figure 6:
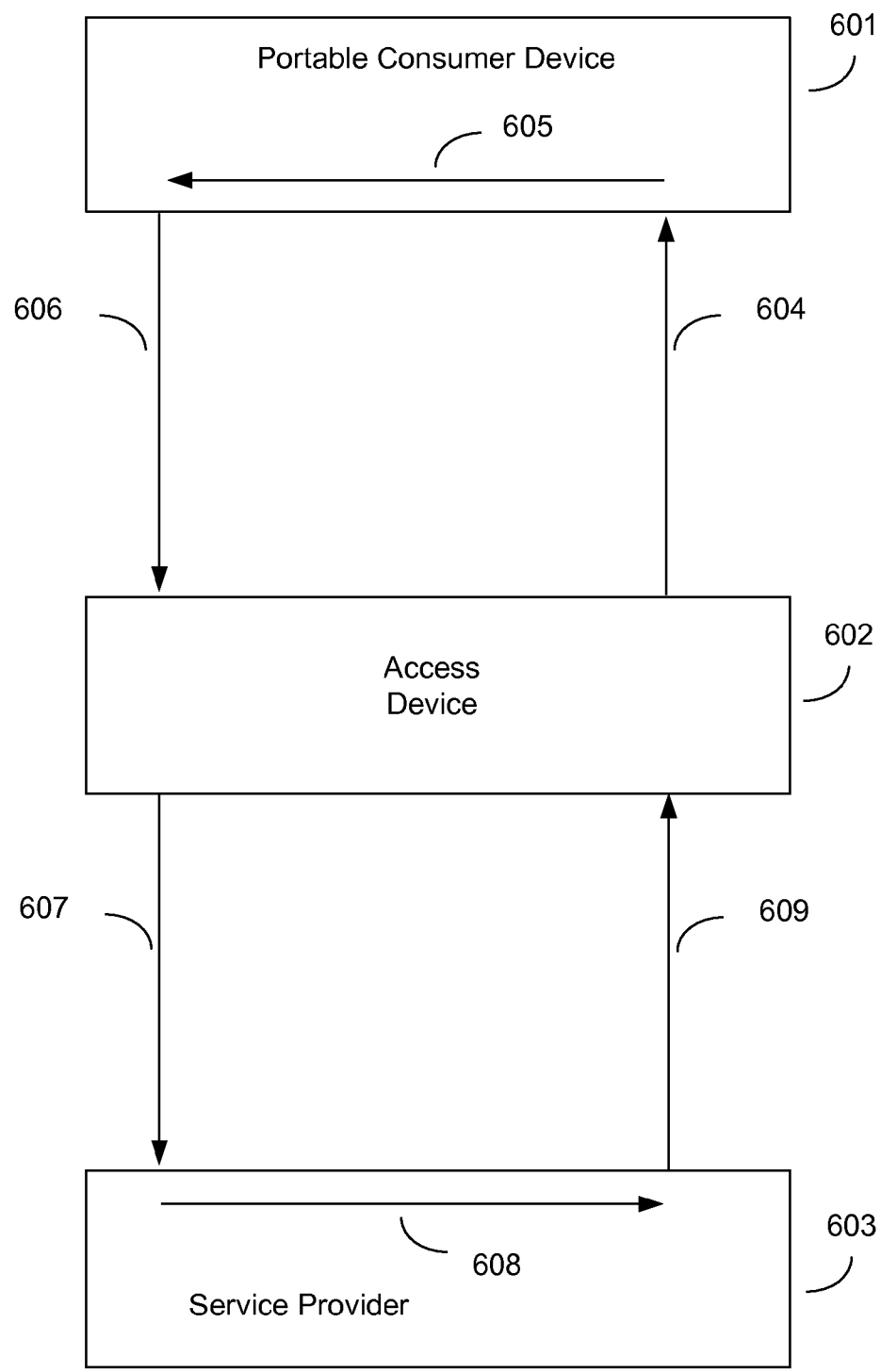
FIG. 6 shows a diagram of the devices used and the dataflow between those devices according to one embodiment.

FIG. 6 show a more detailed view of how data is selected, transformed, transmitted, and verified after a transaction is initiated according to an embodiment of the proposed method.

The devices represented in the embodiment shown in FIG. 6 are a portable consumer device 601, an access device 602, and a service provider 603.

At step 604, a nonce to be used as a dynamic data element and transactional information are sent from the access device to the portable consumer device. As described earlier, the transactional information can include data such as the transaction amount, the terminal ID, and other data relevant to the transaction. Among other things, the nonce can be a random number, a number retrieved from a transaction counter on the access device, a timestamp, or data received from a service provider.

In an example transaction, the data sent to the portable consumer device from the access device could be the following:
TransactionAmount=$24.53
TerminalID=234145
Nonce=20070707323.

At step 605, an authentication code is created in the portable consumer device 601 as a function of the nonce, at least a portion of the transactional information received from the access device, and other locally available data such as a password. As described earlier, the password may already be stored in the memory of the portable consumer device 601. Alternatively, the user of the portable consumer device 601 may need to manually enter the password into the portable consumer device. In certain embodiments, the function used to create the authentication code can be a function such as a hash function. The output of the hash function can also be further modified, such as by truncating the output of the hash function before it is used as the authentication code.

Following the example data previously used, the following data could be used as the inputs to a SHA-256 hash function:
username=jsmith
smalltixpw=doghouse
TransactionAmount=$24.53
TerminalID=234145
Nonce=20070707323.
In this example, a small-value password is used because the transaction amount is below the threshold amount required to trigger the use of a large-value password. This small value password would not need to be entered into the portable consumer device by the user since it is stored on the portable consumer device. The resulting hash of the data could look something like the following:
hash=17d7fc32ee1904f28a831b076ece7b4d352a077029 42eb1dd1ca6fab2f6817da.
This hash output can then be truncated to create an authentication code. For example, the authentication code might be the first sixteen characters of the hash "17d7fc32ee1904f2."

At step 606, the username and authentication code are sent from the portable consumer device 601 to the access device 602. In certain embodiments it may not be necessary to send the username. In other embodiments, other data, such as a portable consumer device ID, can be sent to the access device 602.

Continuing the example, the data sent to the access device 602 could be as follows:
username=jsmith
AuthCode=17d7fc32ee1904f2.

At step 607, the authentication code received from the portable consumer device 601, along with the username, dynamic data element, and other transactional information, is sent to a service provider in an authentication request message. The transactional information sent to the service provider 603 does not need to be the same set of information that was sent to the portable consumer device 601 in step 604. The information sent to the service provider 603 can vary between different embodiments of the invention, but at a minimum, the service provider needs to receive the authentication code and enough additional information so that the service provider 603 can recreate the authentication code. The information sent to the service provider 603 does not need to be directly used to create the authentication code; the information can be used by the service provider 603 to find other data that is used in the authentication code.

For example, the data sent to the service provider 603 might be the following:
username=jsmith
AuthCode=17d7fc32ee1904f2
TransactionAmount=$24.53
TerminalID=234145
Nonce=20070707323.
Notice that the value of the "smalltixpw" is not transmitted to the service provider 603 because the access device 602 does not know the value of this field. The service provider 603 can look up this information using the username.

At step 608 the service provider 603 uses the data received from the access device to authorize the user conducting the transaction involving the portable consumer device 603. In one embodiment this is accomplished by recreating the authentication code received in the authentication request message using the other information received in the authentication request message. The service provider 603 creates its copy of the authentication code using the same methods as used by the portable consumer device.

In the example, the service provider 603 first determines that a small-value transaction password is to be used in this authentication request because the transaction value of "$24.53" is below the threshold amount that would trigger the use of a large-value password. Next, the service provider 603 uses the username "jsmith" received in the authentication request message to lookup the small-value password associated with that account. In this instance, the service provider 603 finds that the small-value password stored in a local database for the account "jsmith" is "d0gh0use." Next, the service provider 603 uses a SHA-256 hash function to hash the received username, TransactionAmount, TerminalID, Nonce, and the retrieved password to obtain a hash value that is identical to the hash value created by the portable consumer device 601. This hash value is then truncated to "17d7fc32ee1904f2."

Once a second authentication code is created at the service provider 603, the second authentication code is compared to the received authorization code to see if the codes match. If the codes do not match, then service provider 603 cannot be certain that the user of the portable consumer device 601 possessed the correct password necessary to use the portable consumer device to conduct the transaction. As a result, the authentication request for the transaction needs to be rejected. If the authentication codes do match, the authentication request for the transaction may be authorized depending on whether the transaction also passes other checks used by the service provider 603.

In the example, the recreated truncated hash value, "17d7fc32ee1904f2" exactly matches the AuthCode received in the authentication request message. Consequently, the transaction can be authorized.

At step 609, the outcome of the authorization check is sent back to the access device 602 in an authentication response message. In addition, the next dynamic data element to be used in the next authentication request by the access device can be sent to the access device in certain embodiments.

In the example, the authentication response message indicates to the access device that the transaction is authorized.

After step 609 is complete, the system is ready for the next authentication request from the access device 602, and the process can repeat for the next transaction.

Figure 7:
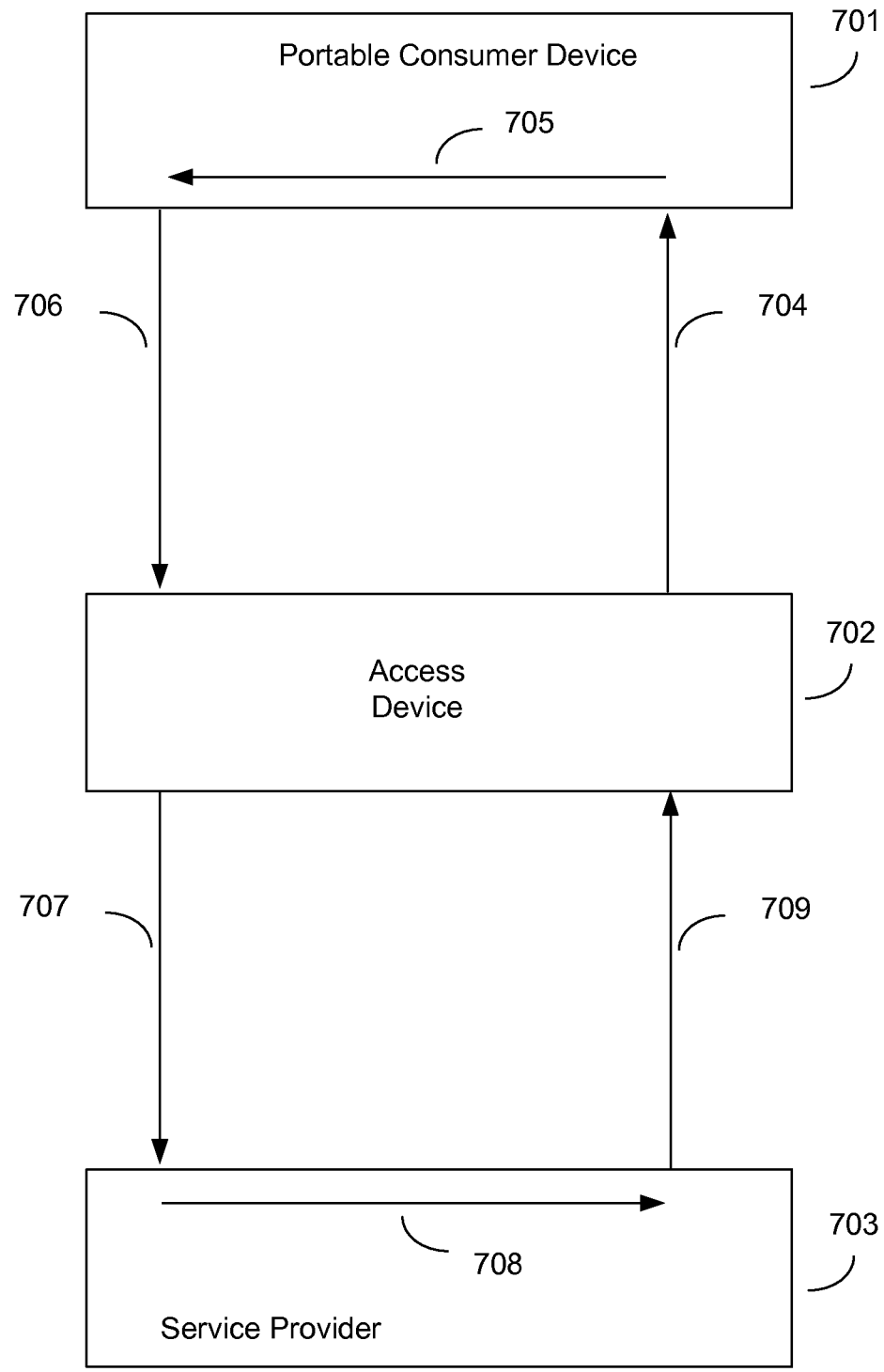
FIG. 7 shows a diagram of the devices used and the dataflow between those devices according to one embodiment.

FIG. 7 shows another example of data being selected, transformed, transmitted, and verified according to another embodiment of the proposed method.

The devices represented in the embodiment shown in FIG. 7 are a consumer device 701, such as a personal computer, an access device 702, such as server computer managed by a merchant, and a service provider 703 (which may operate a different server computer). In some embodiments, the devices represented in FIG. 7 can communicate with each other over a network, such as the Internet. In some embodiments, the consumer device may run a piece of third-party software, such as a web browser, to communicate with the merchant.

At step 704, a dynamic data element, such as a nonce, and transactional information are sent from the access device 702 to the consumer device 701. Variations on what may constitute the transactional information and dynamic data element have been described earlier in this disclosure. In one embodiment, the dynamic data element and the transactional information are sent to a consumer and stored for later use by the consumer's web browser using well-known methods.

At step 705, an authentication code is created by the consumer device 701 as a function of the dynamic data element, at least a portion of the transactional information received from the access device 702, and other locally available data such as a password. As described earlier, the password may already be stored in the memory of the consumer device 701. For example, many web browsers and other programs provide functionality for automatically remembering passwords. Alternatively, the user of the consumer device 701 may need to manually enter the password into the consumer device 701. For example, the consumer may fill out an HTML form on a web page served to the consumer from the access device 702. As described earlier, the authentication code can be created using a function such as a hash function. The output of the hash function can also be further modified, such as by truncating the output of the hash function before it is used as the authentication code. In some embodiments, the consumer device 701 may communicate with an entity other than the access device 702 in order to obtain the proper way to compute the authentication code. For example, the consumer device 701 may communicate with the service provider 703 or another third party affiliated with the service provider 703 to obtain the proper method for creating the authentication code. In some embodiments, the consumer device 701 may store this method for later use.

At step 706, the username and authentication code are sent from the consumer device 701 to the access device 702. As discussed previously, it may not be necessary to send the username in certain embodiments. In other embodiments, other data, such as a consumer device ID, can be sent to the access device 702.

At step 707, the authentication code received from the consumer device 701, along with the username, dynamic data element, and other transactional information, is sent to a service provider in an authentication request message. The transactional information sent to the service provider 703 does not need to be the same set of information that was sent to the consumer device 701 in step 704. The information sent to the service provider 703 can vary between different embodiments of the invention, but at a minimum, the service provider 703 needs to receive the authentication code and enough additional information so that the service provider 703 can recreate the authentication code. The information sent to the service provider 703 does not need to be directly used to create the authentication code; the information can be used by the service provider 703 to find other data that is used in the authentication code.

At step 708 the service provider 703 uses the data received from the access device 702 to authorize the user conducting the transaction involving the consumer device 703. In one embodiment this is accomplished by recreating the authentication code received in the authentication request message using the other information received in the authentication request message. If there is more than one valid dynamic data element for the access device, the service provider will need to use the correct dynamic data element in order to properly recreate the authentication code. The service provider 703 creates its copy of the authentication code using the same methods as used by the consumer device.

Once a second authentication code is created at the service provider 703, the second authentication code is compared to the received authorization code to see if the codes match. If the codes do not match, then service provider 703 cannot be certain that the user of the consumer device 701 possessed the correct password necessary to use the consumer device to conduct the transaction. As a result, the authentication request for the transaction needs to be rejected. If the authentication codes do match, the authentication request for the transaction may be authorized depending on whether the transaction also passes other checks used by the service provider 703.

At step 709, the outcome of the authorization check is sent back to the merchant 702 in an authentication response message. In addition, the next dynamic data element to be used in the next authentication request by the access device 702 can be sent to the access device 702 in certain embodiments.

After step 709 is complete the process can repeat for the next transaction.

Figure 8:
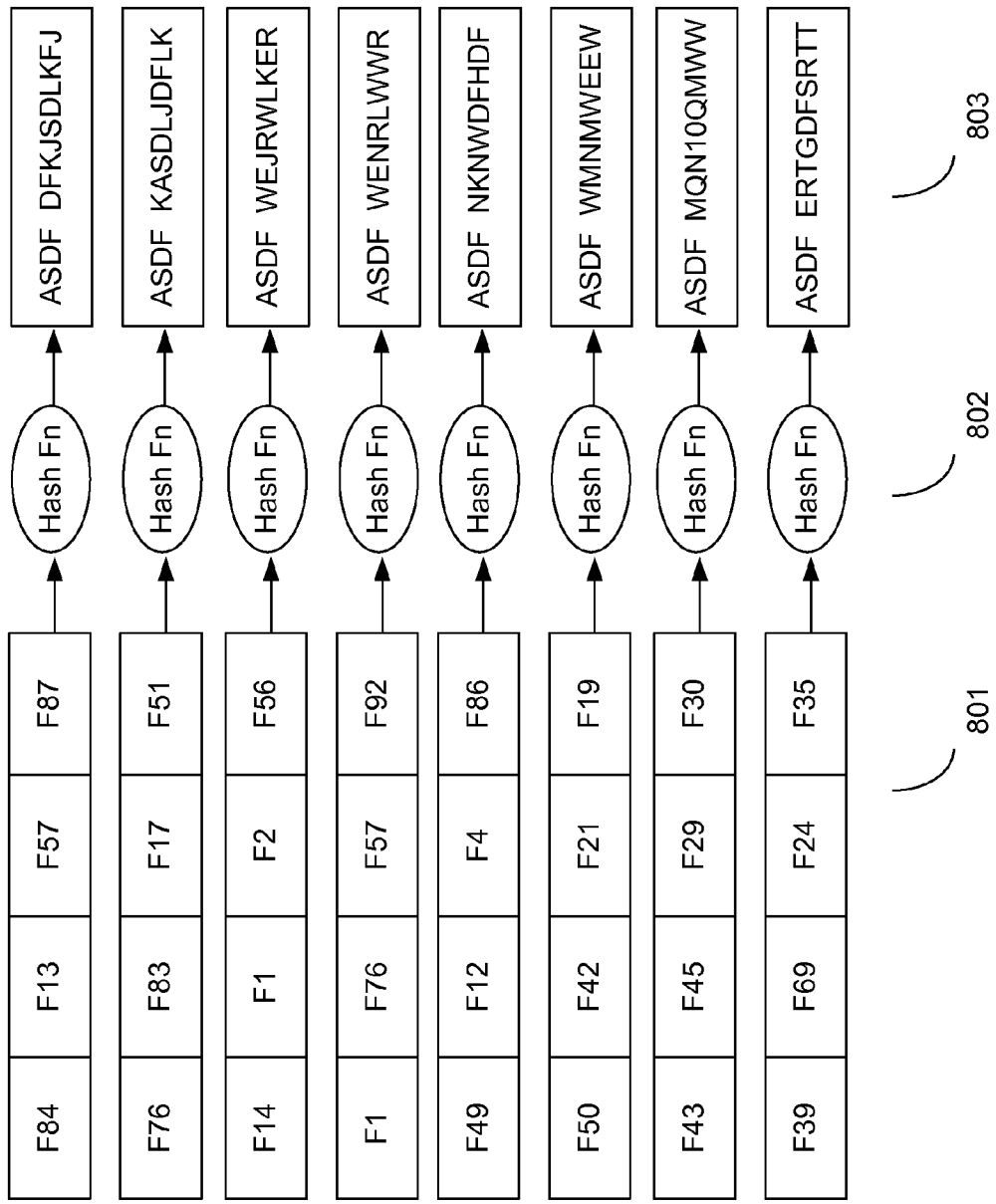
FIG. 8 shows a diagram depicting data collisions.

FIG. 8 is in illustration of data collisions. A collision occurs whenever two or more distinct inputs to a hash function yield the same output. A high frequency of collisions is often considered an undesirable aspect of a hash function, because the higher the rate of collusions, the lower the confidence will be that the hash output will have been created from the desired hash input. Hash functions that produce fixed-length hash outputs for any hash input will always have produce some collisions. Typically, the greater the length of the hash output, the lower the rate of collusions.

FIG. 8 shows many different sets of data 801 being used as inputs to the same hash function 802 producing corresponding hash outputs 803. While all of the hash outputs are unique in FIG. 8, they all happen to have the same first 4 characters "ASDF." If only the first four characters of the hash outputs 803 were used as the hash output, then each of the hash inputs would collide with each other.

While a higher rate of collisions does mean that an entity like an information destination will be less certain that an information provider will have actually held the sensitive data needed to authenticate a transaction, collisions can be advantageous for certain embodiments of the proposed system and method. If transmitted data is intercepted and the correct hash function is known by someone with the intercepted data, then the ability of the person with the intercepted data to determine the exact input string used to create the hash output is diminished, because there are more combinations of values that yield the intercepted hash output. More information is required before someone could determine the exact input data used to create the intercepted output string, and thus the transmitted data is more secure. There is in effect a balance that can be struck between the confidence level an information destination can have in relying on the positive match of a hash output to verify that the information provider held key sensitive data and the extra security that one can achieve for the sensitive transmitted data if the transmitted data is intercepted or otherwise compromised. This is one reason why some embodiments may only use a portion of the hash output, rather than the entire hash output, when implementing the proposed systems and methods.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Embodiments of the invention are not limited to the above-described embodiments. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for securely authenticating a user at an access device, said method comprising:
   sending to a consumer device a dynamic data element and a set of transactional information for a payment transaction conducted between the consumer device and the access device;
   receiving from the consumer device, an authentication code wherein the authentication code is created by the consumer device as a function of at least a subset of the set of transactional information, the dynamic data element, and a password, wherein the subset of the set of transactional information includes an amount of the payment transaction and a terminal identifier of the access device;
   sending an authentication request message to a service provider containing at least the authentication code and additional information sufficient to allow the service provider to recreate the authentication code; and
   receiving from the service provider an authentication response message wherein the authentication response message indicates if the recreated authentication code corresponds to the authentication code sent in the authentication request message.

2. The method of claim 1 further comprising receiving from the service provider a second dynamic data element to be used in the creation of a new authentication code for a next authentication request message sent from the access device.

3. The method of claim 1 wherein the function used to create the authentication code is a hash function.

4. The method of claim 3 wherein an output of the hash function is truncated so that only a portion of the output is used to create the authentication code.

5. The method of claim 1 wherein the password is a small value password if the set of transactional information indicates that the value of the transaction is below a threshold amount.

6. The method of claim 5 wherein the small value password is stored in the consumer device so that the small value password does not need to be manually entered into the consumer device each time the small value password is used.

7. The method of claim 1 wherein the password is a large value password if the first set of transactional information indicates that the value of the transaction is above a threshold amount.

8. The method of claim 7 wherein the large value password is manually entered into the consumer device each time the large value password is used.

9. The method of claim 1 wherein the recreated authentication code is created from at least a subset of the data contained in the authentication request message and data locally available to the service provider.

10. The method of claim 1 wherein the consumer device is a personal computer and the access device is a server computer.

11. The method of claim 10 wherein the access device sends information to and receives information from a web browser running on the consumer device.

12. A non-transitory computer-readable storage medium having code stored thereon for performing the method of claim 1.

13. An access device with a processor and the non-transitory computer-readable storage medium of claim 12.

14. The method of claim 1 wherein the authentication code is created to protect the password from being exposed to third parties in route through an untrusted network of the access device.

15. The method of claim 1 wherein the authentication code is created by the consumer device and transmitted through an untrusted network of the access device without using encryption techniques or transmitting encryption keys.

16. The method of claim 1 wherein the service provider is adapted to look up the password based on username or transaction amount.

17. A method for securely authenticating a user of a consumer device at a service provider computer in an untrusted network, said method comprising:
   receiving at the service provider computer, an authentication request message containing at least an authentication code and additional information sufficient to allow the service provider to recreate the authentication code, wherein the authentication code is created by the consumer device by performing a function on at least three pieces of information including a dynamic data element, a password, and a subset of a set of transactional information for a payment transaction conducted between the consumer device and an access device, wherein the subset of the set of transactional information includes an amount of the payment transaction and a terminal identifier of the access device, wherein the function transforms the three pieces of information into a scrambled form for secure transmission through the untrusted network without using encryption techniques or transmitting encryption keys;

recreating an authentication code as a function of at least the dynamic data element, the subset of information contained in the authentication request message, and other data locally available to the service provider, wherein the locally available data can be retrieved as a function of the data contained in the authentication request;

comparing the recreated authentication code with the authentication code received in the authentication request message;

authenticating the user based on the comparison of the recreated authentication code and the authentication code received in the authentication request message; and sending an authentication response message indicating the result of the authentication step to the access device.

18. The method of claim 17 further comprising sending a second dynamic data element to the access device to be used in the creation of a new authentication code for a next authentication request message sent from the access device.

19. The method of claim 17 wherein the function used to create the authentication code is a hash function.

20. The method of claim 19 wherein an output of the hash function truncated so that only a portion of the output is used to create the authentication code.

21. The method of claim 17 wherein the password is a small value password if the set of transactional information indicates that the value of the transaction is below a threshold amount.

22. The method of claim 21 wherein the small value password is stored in the consumer device so that the small value password does not need to be manually entered into the consumer device each time the small value password is used.

23. The method of claim 17 wherein the password is a large value password if the set of transactional information indicates that the value of the transaction is above a threshold amount.

24. The method of claim 23 wherein the large value password is manually entered into the consumer device each time the large value password is used.

25. The method of claim 17 wherein the consumer device is a personal computer and the access device is a server computer.

26. A non-transitory computer-readable storage medium having code stored thereon for performing the method of claim 17.

27. A server computer with a processor and the non-transitory computer-readable storage medium of claim 26.

* * * * *